(12) United States Patent
Nogami

(10) Patent No.: US 6,785,064 B2
(45) Date of Patent: Aug. 31, 2004

(54) OBJECTIVE LENS UNIT AND METHOD OF ASSEMBLING OBJECTIVE LENS UNIT

(75) Inventor: Toyoshi Nogami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/370,706

(22) Filed: Feb. 24, 2003

(65) Prior Publication Data

US 2003/0161056 A1 Aug. 28, 2003

(30) Foreign Application Priority Data

Feb. 25, 2002 (JP) .................................... P2002-047318

(51) Int. Cl.$^7$ ............................. G02B 7/02; G11B 7/00; G11B 17/00
(52) U.S. Cl. ....................... 359/814; 359/813; 359/824; 369/44.15; 369/44.16; 369/244
(58) Field of Search ................................. 359/813, 814, 359/823, 824, 822, 811; 369/44.14, 44.15, 44.16, 244

(56) References Cited

U.S. PATENT DOCUMENTS 6,330,119 B1 * 12/2001 Kasahara et al. ........... 359/813
6,549,346 B2 * 4/2003 Wada et al. ................. 359/814

FOREIGN PATENT DOCUMENTS

JP 2000-348360 12/2000
WO WO 02/09101 A1 1/2002

* cited by examiner

Primary Examiner—Loha Ben
(74) Attorney, Agent, or Firm—Morgan, Lewis & Bockius LLP

(57) ABSTRACT

An objective lens unit has a reinforcing frame portions formed along an outer peripheral surface of each of a pair of tracking coils by applying an epoxy resin adhesive to portions between a lens holder and the outer peripheral surface of each of the tracking coils. Reinforcing core portions are formed by filling the epoxy resin adhesive into a central hole of each of the tracking coils, and a reinforcing connecting portion is formed by filling the epoxy resin adhesive into a gap defined by the lens holder, each of the tracking coils, and a focusing coil.

6 Claims, 6 Drawing Sheets

OBJECTIVE LENS UNIT AND METHOD OF ASSEMBLING OBJECTIVE LENS UNIT

The present disclosure relates to the subject matter contained in Japanese Patent Application No. 2002-047318 filed Feb. 25, 2002, which is incorporated herein by reference in its entirety.

BACKGROUND OF THE INVENTION

1. Field of the Invention

The present invention relates to an objective lens unit for an optical pickup used in a compact disk (CD), a digital video disk (DVD), or the like, and a method of assembling an objective lens unit.

2. Description of the Related Art

As one of the techniques concerning an objective lens unit, one disclosed in JP-A-2000-348360 is conventionally known. As shown in FIGS. 9 and 10, this objective lens unit is comprised of a base frame 2 having a supporting shaft 1 provided uprightly on its center; a lens holder 3 for fitting a boss portion 3a formed in the center thereof to the supporting shaft 1 so as to be slidable along the direction of an axis O of the supporting shaft 1 and to be capable of oscillating about the axis O; a focusing coil 4 that is externally fitted on the boss portion 3a; a pair of tracking coils 5 respectively disposed on both side surfaces of the lens holder 3; a pair of magnets 6 respectively disposed on both side portions of the base frame 2 with the lens holder 3 interposed therebetween; and a pair of magnets 8 respectively secured to a pair of yokes 9 respectively inserted in a pair of through holes 3b of the lens holder 3. As the lens holder 3 is slid in focusing directions a and b along the axis O by energizing the focusing coil 4, the focus of an objective lens 7 provided in the lens holder 3 is adjusted to a disk (not shown), and the lens holder 3 is oscillated in tracking directions c and d about the axis O by energizing the tracking coils 5, to thereby follow a predetermined track of the disk.

To describe the assembling procedure, in a state in which the respective coils 4 and 5 are pressed against predetermined positions on the lens holder 3, the respective coils 4 and 5 are energized to undergo self-heating, there by melting fusible coatings of the coils 4 and 5. Subsequently, the energization is stopped to cool the fusible coatings, and the coils 4 and 5 are adhered and fixed to the lens holder 3 by the fusible coatings that is rehardened by that cooling.

In the above-described conventional construction, the thickness of the fusible coatings of the focusing coil 4 and the tracking coils 5 is thin, and the adhesiveness based on the fusible coatings is weak, so that the state in which the focusing coil 4 and the tracking coils 5 are adhered and fixed to the lens holder 3 is unreliable. For this reason, when the lens holder 3 is oscillated in the tracking directions c and d by energizing the tracking coils 5, there is a possibility that the lens holder sways unexpectedly due to the resonance phenomenon and that the focus servo characteristic based on the focusing coil 4 becomes unstable.

It is conceivable to adhere the focusing coil 4 and the tracking coils 5 to the lens holder 3 by using an instantaneous adhesive. According to this method, however, since the strength of the instantaneous adhesive is small, the coils 4 and 5 are liable to peel off the lens holder 3.

In addition, it is conceivable to adhere the focusing coil 4 and the tracking coils 5 to the lens holder 3 by using an ultraviolet-curing adhesive. According to this method, however, since the structure in which the coils 4 and 5 are mounted is complex, it is difficult to uniformly irradiate the entire portion with the ultraviolet rays, and the state of curing is liable to become uneven.

Further, it is conceivable to form pockets for accommodating the coils 4 and 5 on the lens holder 3. According to this method, however, the shape of the lens holder 3 becomes complex due to the formation of the pockets, and the cost of a mold becomes expensive.

SUMMARY OF THE INVENTION

An object of the invention is to provide an objective lens unit that makes it possible to reliably fix a focusing coil and tracking coils at low cost, and to provide a method of assembling the objective lens unit.

To attain the above object, according to a first aspect of the invention, there is provided an objective lens unit comprising: a base frame having a supporting shaft provided uprightly on a center thereof; a lens holder having a boss portion formed in a center thereof and fitted to the supporting shaft so as to be slidable along a direction of an axis of the supporting shaft and to be capable of oscillating about the axis; a focusing coil externally fitted on the boss portion; a pair of tracking coils respectively disposed on both side surfaces of the lens holder, each tracking coil having a central hole; a pair of magnets respectively disposed on both side portions of the base frame with the lens holder interposed therebetween; reinforcing frame portions formed along an outer peripheral surface of each of the tracking coils by applying an epoxy resin adhesive to portions between the lens holder and the outer peripheral surface of each of the tracking coils; reinforcing core portions formed by filling the epoxy resin adhesive into the central hole of each of the tracking coils; and a reinforcing connecting portion formed by filling the epoxy resin adhesive into a gap defined by the lens holder, each of the tracking coils, and the focusing coil.

According to the above-described construction, by applying an epoxy resin adhesive to regions ranging from peripheries of each tracking coil to the focusing coil, a reinforcing frame portion is formed along an outer peripheral surface of each tracking coil, a reinforcing core portion is formed in a central hole of each tracking coil, and a reinforcing connecting portion is formed in a gap defined by the lens holder, each tracking coil, and the focusing coil. Consequently, since the tracking coils and the focusing coil are integrally connected securely to the lens holder, it is possible to reduce peaks of resonance of the lens holder when the lens holder is oscillated in tracking directions by energizing each tracking coil. Accordingly, the lens holder does not sway unexpectedly due to the resonance phenomenon in a conventional fashion, so that it is possible to stabilize the focus servo characteristic based on the focusing coil.

In addition, in forming the aforementioned reinforcing frame, reinforcing core portion, and reinforcing connecting portion, the epoxy resin adhesive is merely applied to regions ranging from peripheries of each tracking coil to the focusing coil. Since it is unnecessary to perform special processing with respect to the lens holder, the cost of a mold for the lens holder can be made low.

According to a second aspect of the invention, there is provided an objective lens unit comprising: a base frame having a supporting shaft provided uprightly on a center thereof; a lens holder having a boss portion formed in a center thereof and fitted to the supporting shaft so as to be slidable along a direction of an axis of the supporting shaft and to be capable of oscillating about the axis; a focusing coil externally fitted on the boss portion; a pair of tracking coils respectively disposed on both side surfaces of the lens holder; a pair of magnets respectively disposed on both side portions of the base frame with the lens holder interposed therebetween; and reinforcing frame portions formed along an outer peripheral surface of each of the tracking coils by applying an adhesive to portions between the lens holder and the outer peripheral surface of each of the tracking coils.

According to the above-described construction, since each of the tracking coils is firmly secured to the lens holder by the reinforcing frame portion formed along the outer peripheral surface of each tracking coil, it is possible to reduce peaks of resonance of the lens holder when the lens holder is oscillated in the tracking directions by energizing each tracking coil. Accordingly, the lens holder does not sway unexpectedly due to the resonance phenomenon in a conventional fashion, so that it is possible to stabilize the focus servo characteristic based on the focusing coil. In addition, the aforementioned reinforcing frames can be formed by merely applying the adhesive to the portion between the lens holder and the outer peripheral surface of each tracking coil. Since it is unnecessary to perform special processing with respect to the lens holder, the cost of the mold for the lens holder can be made low.

According to a third aspect of the invention, a reinforcing core portion is formed by filling the adhesive into a central hole of each of the tracking coils.

According to the above-described construction, the tracking coils can be fixed to the lens holder more securely by means of the reinforcing frame portions formed along the outer peripheral surfaces of the tracking coils and the reinforcing core portions filled in the central holes of the tracking coils, thereby making it possible to further stabilize the focus servo characteristic. In addition, the reinforcing core portions can be formed by merely filling the epoxy resin adhesive into the central holes of the tracking coils. Since it is unnecessary to perform special processing with respect to the lens holder, the cost of the mold for the lens holder can be made low.

According to a fourth aspect of the invention, a reinforcing connecting portion is formed by filling the adhesive into a gap defined by the lens holder, each of the tracking coils, and the focusing coil.

According to the above-described construction, the tracking coils and the focusing coil can be integrally connected securely to the lens holder by the reinforcing connecting portion formed of the adhesive filled in the gap defined by these members. Thus it is possible to attain stabilization of the focus servo characteristic.

According to a fifth aspect of the invention, the adhesive is made of epoxy resin.

According to the above-described construction, each tracking coil or the focusing coil can be bonded securely to the lens holder by the adhesive that is constituted by an epoxy resin.

According to a sixth aspect of the invention, there is provided a method of assembling an objective lens unit, the method comprising: providing an objective lens unit including a base frame having a supporting shaft provided uprightly on a center thereof, a lens holder having a boss portion formed in a center thereof and fitted to the supporting shaft so as to be slidable along a direction of an axis of the supporting shaft and to be capable of oscillating about the axis, a focusing coil externally fitted on the boss portion, a pair of tracking coils respectively disposed on both side surfaces of the lens holder, and a pair of magnets respectively disposed on both side portions of the base frame with the lens holder interposed therebetween; applying a thermosetting adhesive to portions between the lens holder and an outer peripheral surface of each of the tracking coils; filling the thermosetting adhesive into a central hole of each of the tracking coils; filling the thermosetting adhesive into a gap defined by the lens holder, each of the tracking coils, and the focusing coil; and curing the thermosetting adhesive by heating, thereby forming reinforcing frame portions along the outer peripheral surface of each of the tracking coils, forming reinforcing core portions in the central hole of each of the tracking coils, and forming a reinforcing connecting portion in the gap defined by the lens holder, each of the tracking coils, and the focusing coil.

According to the above-described construction, by merely effecting heating after application of the thermosetting adhesive to regions ranging from peripheries of each tracking coil to the focusing coil, the tracking coils and the focusing coil can be integrally connected securely to the lens holder, and it is possible to form an objective lens unit excelling in the focus servo characteristic.

DETAILED DESCRIPTION OF THE PREFFERED EMBODIMENTS

Figure 1:
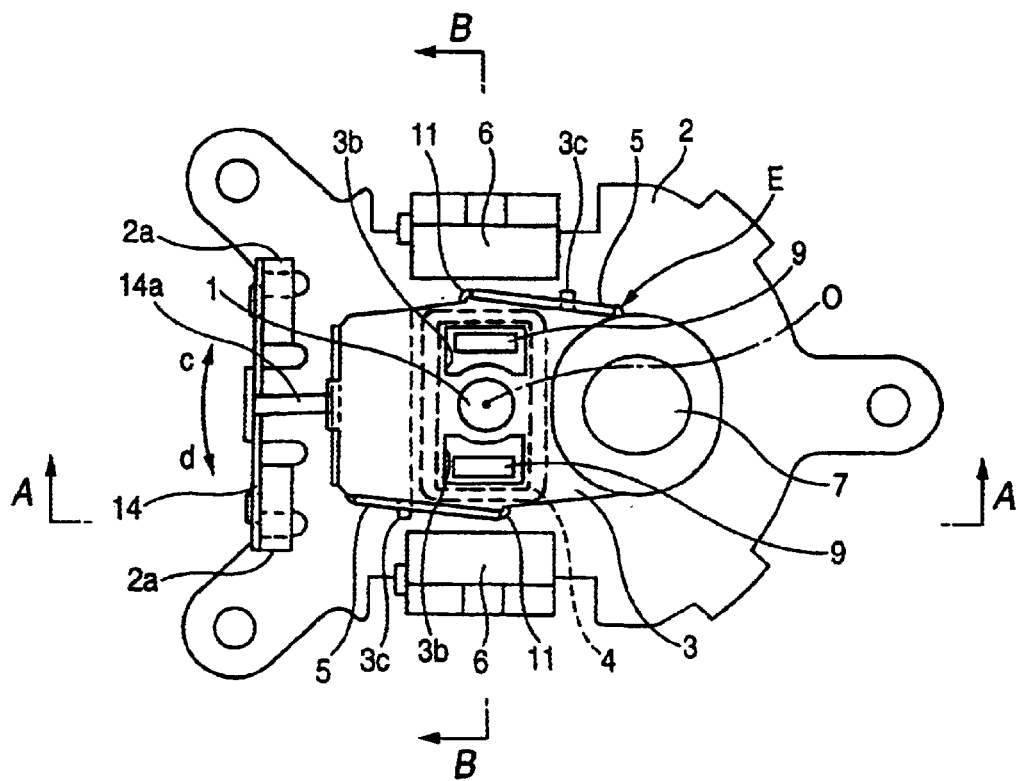
FIG. 1 is a plan view illustrating an objective lens unit of an embodiment of the invention.
Figure 2:
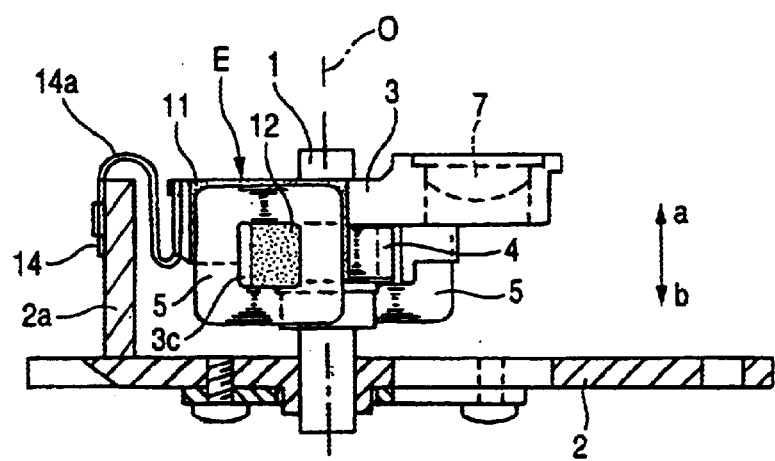
FIG. 2 is a sectional view taken along line A—A of FIG. 1.
Figure 3:
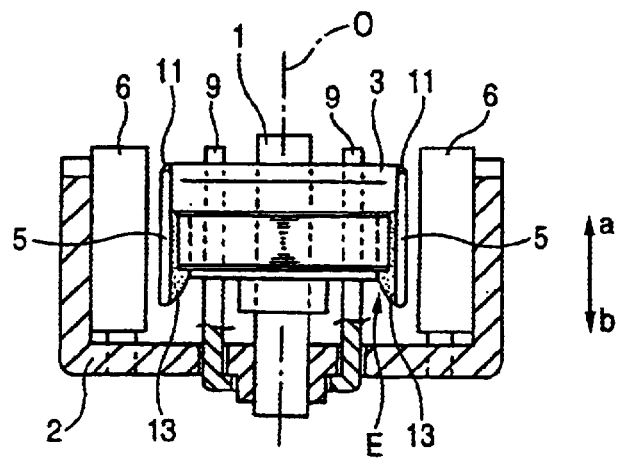
FIG. 3 is a sectional view taken along line B—B of FIG. 1.
Figure 4:
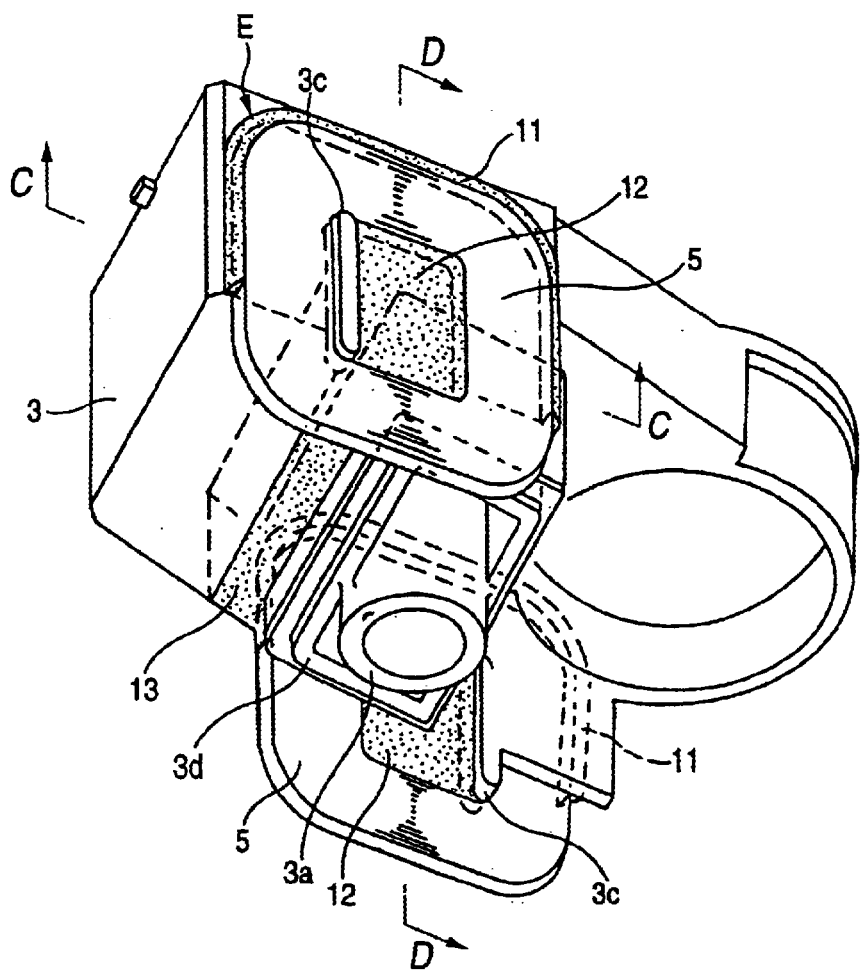
FIG. 4 is a partial perspective view of the embodiment.
Figure 5:
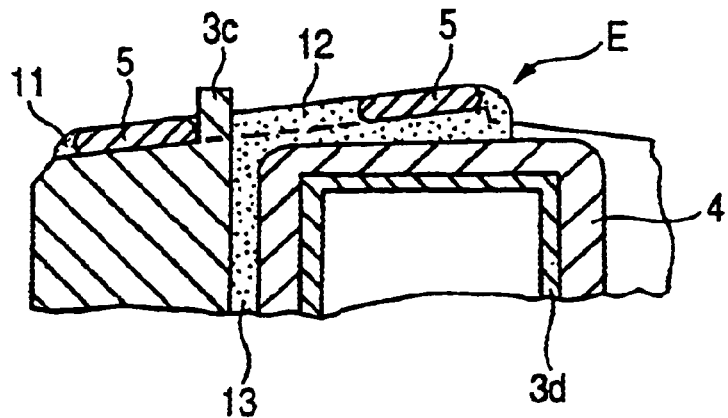
FIG. 5 is a sectional view taken along line C—C of FIG. 4.
Figure 6:
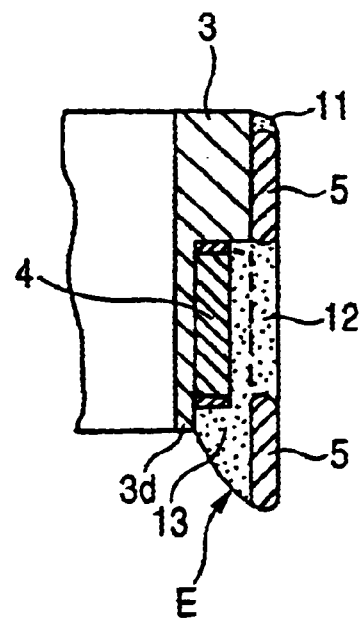
FIG. 6 is a sectional view taken along line D—D of FIG. 4.
Figure 7:
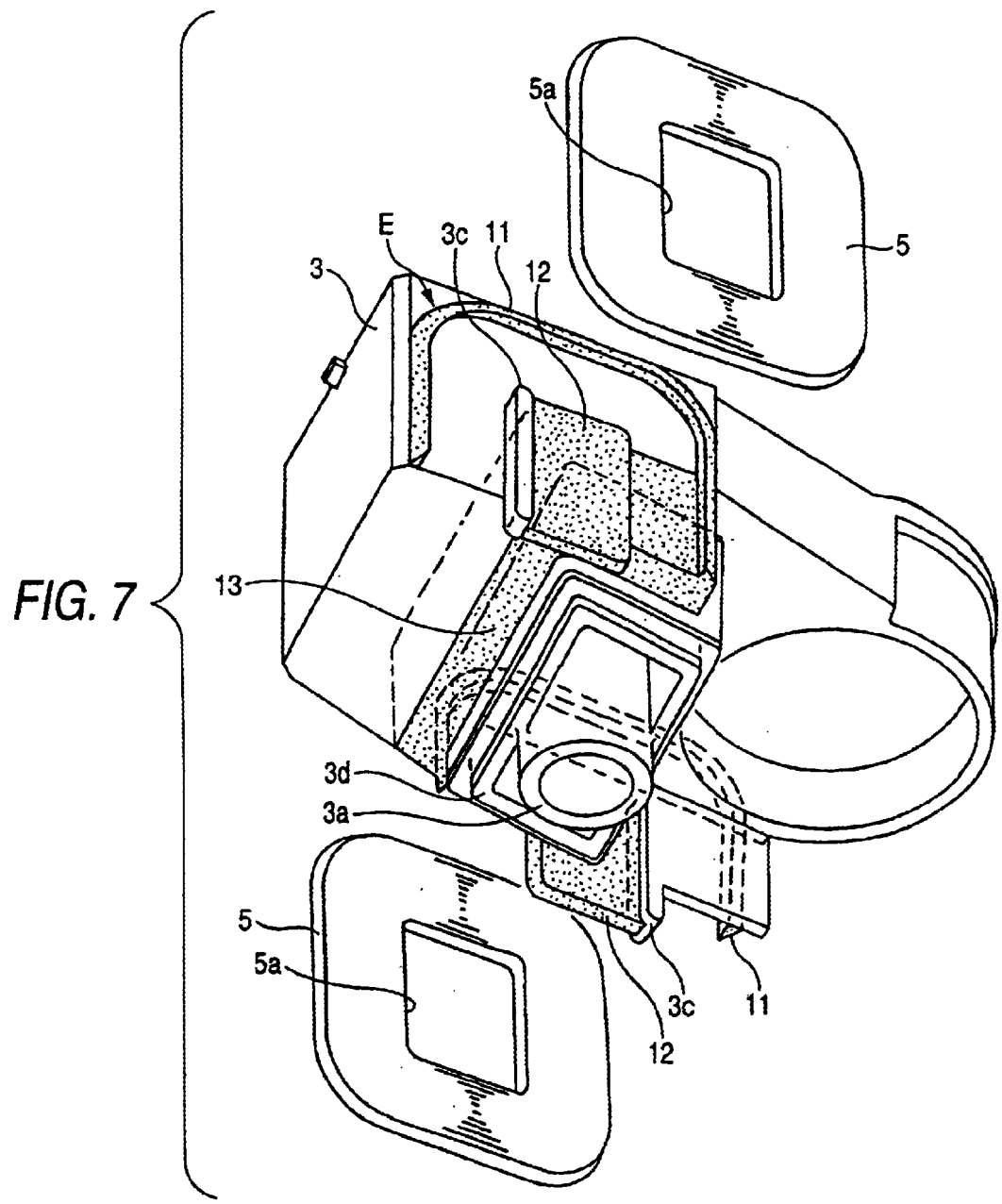
FIG. 7 is a partial exploded perspective view of the embodiment.
Figure 8:
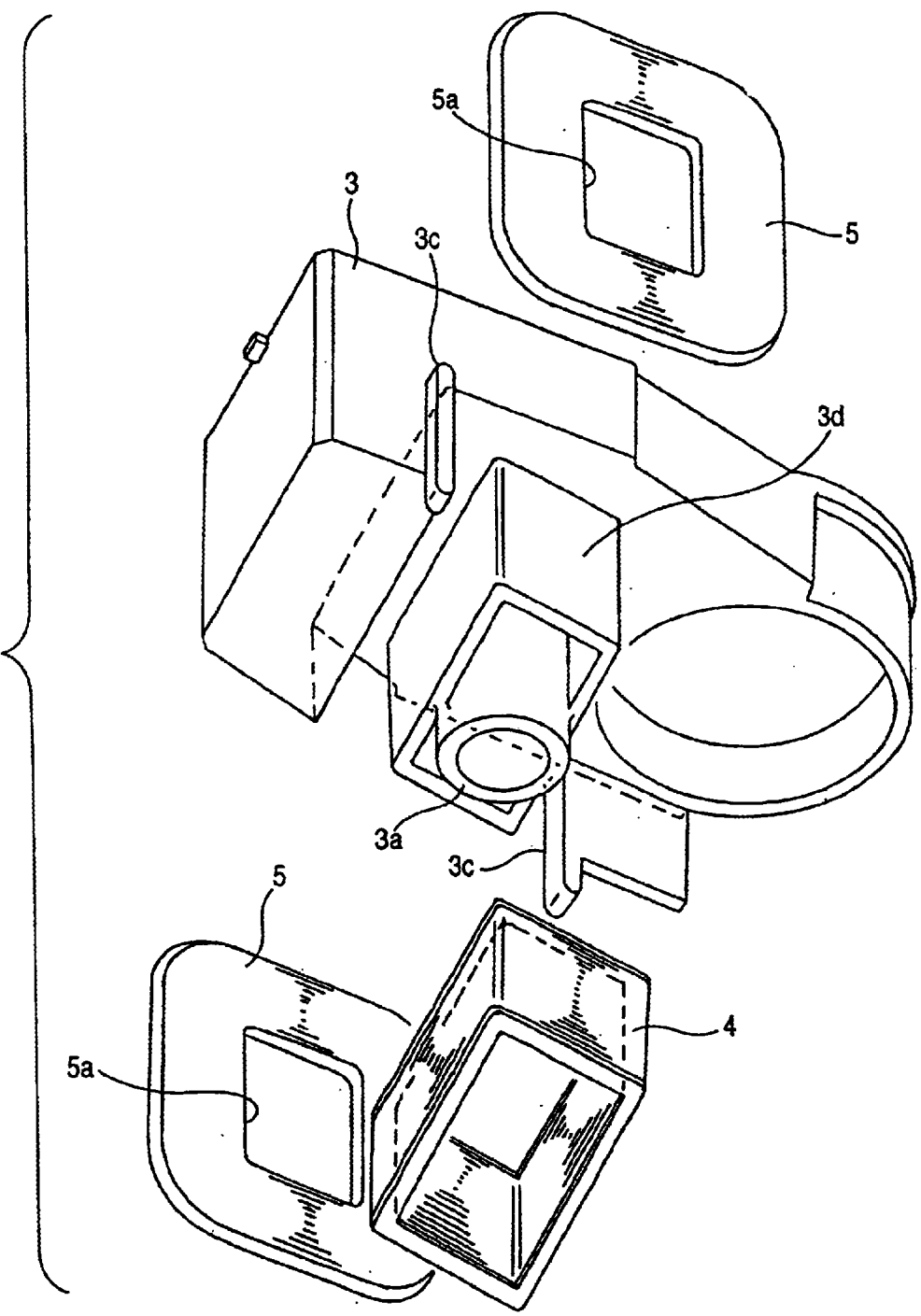
FIG. 8 is a partial exploded perspective view of the embodiment prior to the application of an adhesive.

FIGS. 1 to 3 show an objective lens unit according to an embodiment of the invention; FIGS. 4 to 7 show essential portions thereof; and FIG. 8 shows the essential portions prior to the application of an adhesive. By applying an epoxy resin adhesive E to regions ranging from peripheries of each of a pair of tracking coils 5 to a focusing coil 4, a pair of reinforcing frame portions 11 are each formed along an outer peripheral surface of each tracking coil 5, a pair of reinforcing core portions 12 are each formed in a central hole 5a of each tracking coil 5, and a reinforcing connecting portion 13 is formed in a gap defined by a lens holder 3, each tracking coil 5, and the focusing coil 4.

Figure 9:
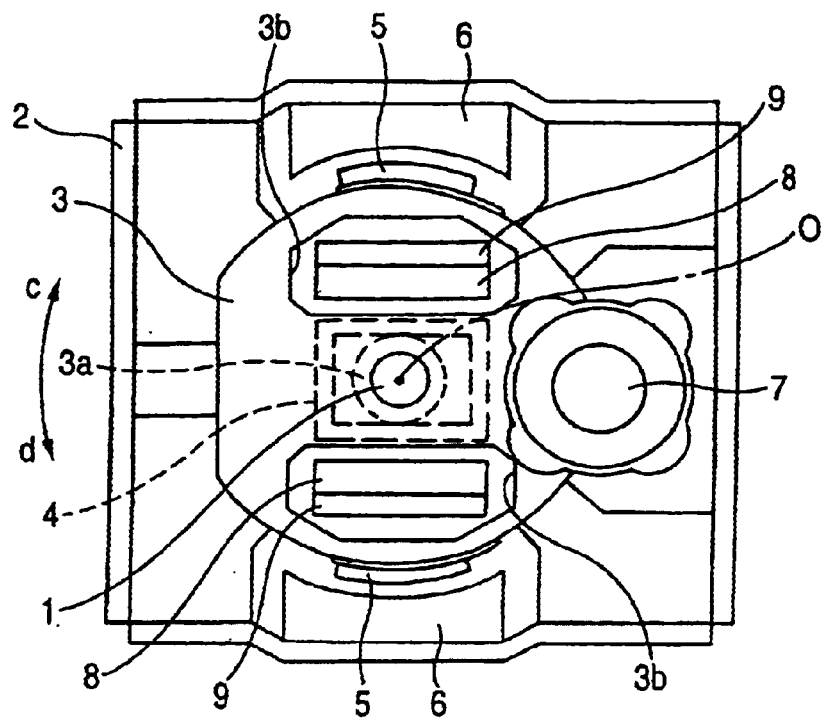
FIG. 9 is a plan view illustrating a conventional example.
Figure 10:
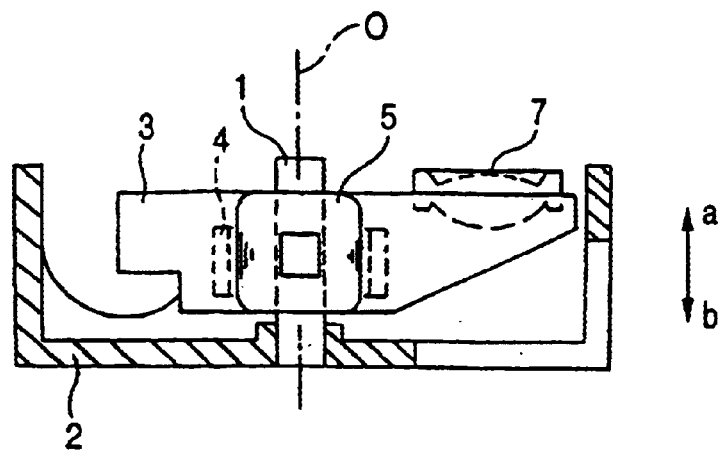
FIG. 10 is a vertical cross-sectional view of the conventional example.

Each of a pair of magnets 6 is used for both of each tracking coil 5 and the focusing coil 4. A pair of projections 3c for positioning the respective tracking coils 5 are provided projectingly on the side surfaces of the lens holder 3. A rectangular frame portion 3d for fitting the focusing coil 4 is integrally formed on a boss portion 3a. A lead wire 14a extending from a printed circuit board 14 provided on an upright plate 2a on a base frame 2 is connected to each tracking coil 5 and the focusing coil 4. Since arrangements other than those described above are substantially identical to those shown in FIGS. 9 and 10, identical portions will be denoted by the same reference numerals, and a description thereof will be omitted.

As shown in FIGS. 4 to 7, each of the aforementioned reinforcing frame portions 11 is formed substantially in a U shape along an outer peripheral surface of each tracking coil 5 by applying an epoxy resin adhesive E to a gap between the lens holder 3 and the outer peripheral surface of each tracking coil 5.

According to the above-described construction, since each of the tracking coils 5 is firmly secured to the lens holder 3 by the reinforcing frame portion 11 formed along the outer peripheral surface of each tracking coil 5, it is possible to reduce peaks of resonance of the lens holder 3 when the lens holder 3 is oscillated in the tracking directions c and d by energizing each tracking coil 5. Accordingly, the lens holder 3 does not sway unexpectedly due to the resonance phenomenon in a conventional fashion, so that it is possible to stabilize the focus servo characteristic based on the focusing coil 4. In addition, the aforementioned reinforcing frames can be formed by merely applying the epoxy resin adhesive E to the gap between the lens holder 3 and the outer peripheral surface of each tracking coil 5. Since it is unnecessary to perform special processing with respect to the lens holder 3, the cost of a mold for the lens holder 3 can be made low.

As shown in FIGS. 4 to 7, each of the aforementioned reinforcing core portions 12 is formed into the shape of a substantially rectangular projection by filling the epoxy resin adhesive E into the central hole 5a of each tracking coil 5.

According to the above-described construction, the tracking coils 5 can be fixed to the lens holder 3 more securely by means of the above-described reinforcing frame portions 11 and the reinforcing core portions 12 filled in the central holes 5a of the respective tracking coils 5, thereby making it possible to further stabilize the focus servo characteristic. In addition, the reinforcing core portions 12 can be formed by merely filling the epoxy resin adhesive E into the central holes 5a of the tracking coils 5, and since it is unnecessary to perform special processing with respect to the lens holder 3, the cost of the mold for the lens holder 3 can be made low.

As shown in FIGS. 4 to 7, the reinforcing connecting portion 13 is formed by filling the epoxy resin adhesive E into the gap defined by the lens holder 3, each tracking coil 5, and the focusing coil 4.

According to the above-described construction, the tracking coils 5 and the focusing coil 4 can be integrally connected securely to the lens holder 3 by the reinforcing connecting portion 13 formed of the epoxy resin adhesive E filled in the gap defined by these members. Thus it is possible to attain stabilization of the focus servo characteristic.

To describe the assembling procedure, the tracking coils 5 and the focusing coil 4 are tentatively secured to predetermined positions on the lens holder 3 by using an instantaneous adhesive, and the epoxy resin adhesive E is then applied to regions ranging from the peripheries of each tracking coil 5 to the focusing coil 4, thereby forming the reinforcing frame portions 11, the reinforcing core portions 12, and the reinforcing connecting portion 13. Subsequently, the objective lens unit is placed in an electric heating furnace and is heated to 100° C. or thereabouts to cure the epoxy resin adhesive E.

According to the first aspect of the invention, by applying an epoxy resin adhesive to regions ranging from peripheries of each tracking coil to the focusing coil, a reinforcing frame portion is formed along an outer peripheral surface of each tracking coil, a reinforcing core portion is formed in a central hole of each tracking coil, and a reinforcing connecting portion is formed in a gap defined by the lens holder, each tracking coil, and the focusing coil. Consequently, since the tracking coils and the focusing coil are integrally connected securely to the lens holder, it is possible to reduce peaks of resonance of the lens holder when the lens holder is oscillated in tracking directions by energizing each tracking coil. Accordingly, the lens holder does not sway unexpectedly due to the resonance phenomenon in a conventional fashion, so that it is possible to stabilize the focus servo characteristic based on the focusing coil.

In addition, in forming the aforementioned reinforcing frame, reinforcing core portion, and reinforcing connecting portion, the epoxy resin adhesive is merely applied to regions ranging from peripheries of each tracking coil to the focusing coil, and since it is unnecessary to perform special processing with respect to the lens holder, cost of a mold for the lens holder can be made low.

According to the second aspect of the invention, since each of the tracking coils is firmly secured to the lens holder by the reinforcing frame portion formed along the outer peripheral surface of each tracking coil, it is possible to reduce peaks of resonance of the lens holder when the lens holder is oscillated in the tracking directions by energizing each tracking coil. Accordingly, the lens holder does not sway unexpectedly due to the resonance phenomenon in a conventional fashion, so that it is possible to stabilize the focus servo characteristic based on the focusing coil. In addition, the aforementioned reinforcing frames can be formed by merely applying the adhesive to the gap between the lens holder and the outer peripheral surface of each tracking coil. Since it is unnecessary to perform special processing with respect to the lens holder, the cost of the mold for the lens holder can be made low.

According to the third aspect of the invention, the tracking coils can be fixed to the lens holder more securely by means of the reinforcing frame portions formed along the outer peripheral surfaces of the tracking coils and the reinforcing core portions filled in the central holes of the tracking coils, thereby making it possible to further stabilize the focus servo characteristic. In addition, the reinforcing core portions can be formed by merely filling the epoxy resin adhesive into the central holes of the tracking coils, and since it is unnecessary to perform special processing with respect to the lens holder, the cost of the mold for the lens holder can be made low.

According to the fourth aspect of the invention, the tracking coils and the focusing coil can be integrally connected securely to the lens holder by the reinforcing connecting portion formed of the adhesive filled in the gap defined by these members. Thus it is possible to attain stabilization of the focus servo characteristic.

According to the fifth aspect of the invention, each tracking coil or the focusing coil can be bonded securely to the lens holder by the adhesive that is constituted by an epoxy resin.

According to the sixth aspect of the invention, by merely effecting heating after application of the thermosetting adhesive to regions ranging from peripheries of each tracking coil to the focusing coil, the tracking coils and the focusing coil can be integrally connected securely to the lens holder, and it is possible to form an objective lens unit excelling in the focus servo characteristic.

What is claimed is:

1. An objective lens unit comprising:

a base frame having a supporting shaft provided uprightly on a center thereof;

a lens holder having a boss portion formed in a center thereof and fitted to the supporting shaft so as to be slidable along a direction of an axis of the supporting shaft and to be capable of oscillating about the axis;

a focusing coil externally fitted on the boss portion;

a pair of tracking coils respectively disposed on both side surfaces of the lens holder, each tracking coil having a central hole;

a pair of magnets respectively disposed on both side portions of the base frame with the lens holder interposed therebetween;

reinforcing frame portions formed along an outer peripheral surface of each of the tracking coils by applying an epoxy resin adhesive to portions between the lens holder and the outer peripheral surface of each of the tracking coils;

reinforcing core portions formed by filling the epoxy resin adhesive into the central hole of each of the tracking coils; and a reinforcing connecting portion formed by filling the epoxy resin adhesive into a gap defined by the lens holder, each of the tracking coils, and the focusing coil.

2. An objective lens unit comprising:

a base frame having a supporting shaft provided uprightly on a center thereof;

a lens holder having a boss portion formed in a center thereof and fitted to the supporting shaft so as to be slidable along a direction of an axis of the supporting shaft and to be capable of oscillating about the axis;

a focusing coil externally fitted on the boss portion;

a pair of tracking coils respectively disposed on both side surfaces of the lens holder;

a pair of magnets respectively disposed on both side portions of the base frame with the lens holder interposed therebetween; and reinforcing frame portions formed along an outer peripheral surface of each of the tracking coils by applying an adhesive to portions between the lens holder and the outer peripheral surface of each of the tracking coils.

3. The objective lens unit according to claim 2, wherein reinforcing core portions are formed by filling the adhesive into a central hole of each of the tracking coils.

4. The objective lens unit according to claim 2, wherein a reinforcing connecting portion is formed by filling the adhesive into a gap defined by the lens holder, each of the tracking coils, and the focusing coil.

5. The objective lens unit according to claim 2, wherein the adhesive is made of epoxy resin.

6. A method of assembling an objective lens unit, the method comprising:

providing an objective lens unit including a base frame having a supporting shaft provided uprightly on a center thereof, a lens holder having a boss portion formed in a center thereof and fitted to the supporting shaft so as to be slidable along a direction of an axis of the supporting shaft and to be capable of oscillating about the axis, a focusing coil externally fitted on the boss portion, a pair of tracking coils respectively disposed on both side surfaces of the lens holder, and a pair of magnets respectively disposed on both side portions of the base frame with the lens holder interposed therebetween;

applying a thermosetting adhesive to portions between the lens holder and an outer peripheral surface of each of the tracking coils;

filling the thermosetting adhesive into a central hole of each of the tracking coils;

filling the thermosetting adhesive into a gap defined by the lens holder, each of the tracking coils, and the focusing coil; and curing the thermosetting adhesive by heating, thereby forming reinforcing frame portions along the outer peripheral surface of each of the tracking coils, forming reinforcing core portions in the central hole of each of the tracking coils, and forming a reinforcing connecting portion in the gap defined by the lens holder, each of the tracking coils, and focusing coil.

* * * * *